United States Patent [19]
Wada et al.

[11] Patent Number: 4,812,974
[45] Date of Patent: Mar. 14, 1989

[54] DATA PROCESSING APPARATUS FOR PROCESSING LIST VECTOR INSTRUCTIONS

[75] Inventors: Hideo Wada; Shuichi Abe; Tsuyoshi Watanabe, all of Hadano, Japan

[73] Assignee: Hitachi, Ltd., Tokyo, Japan

[21] Appl. No.: 823,531

[22] Filed: Jan. 29, 1986

[30] Foreign Application Priority Data

Jan. 29, 1985 [JP] Japan .................. 60-14768

[51] Int. Cl.⁴ .......................................... G06F 12/06
[52] U.S. Cl. .................................................. 364/200
[58] Field of Search ... 364/200 MS File, 900 MS File, 364/736

[56] References Cited

U.S. PATENT DOCUMENTS

| | | | |
|---|---|---|---|
| 4,172,287 | 10/1979 | Kawabe et al. | 364/736 |
| 4,293,941 | 10/1981 | Muraoka et al. | 364/200 |
| 4,541,046 | 9/1985 | Nagashima et al. | 364/200 |
| 4,594,682 | 6/1986 | Drimak | 364/900 |
| 4,617,625 | 10/1986 | Nagashima et al. | 364/200 |
| 4,651,274 | 3/1987 | Omoda et al. | 364/200 |
| 4,760,545 | 7/1988 | Inagami et al. | 364/200 |

FOREIGN PATENT DOCUMENTS 2133595A 7/1984 United Kingdom ............... 364/300

Primary Examiner—Archie E. Williams, Jr.
Assistant Examiner—Emily Y. Chan
Attorney, Agent, or Firm—Antonelli, Terry & Wands

[57] ABSTRACT

List operation on a vector in which the number of an element of a vector operand is represented by an element of another vector operand is to be performed with a general-purpose computer system having no vector registers. List vector elements are read out from a memory by adding at addresses determined sequentially by adding by adding values of a request vector increment register to a list vector address. A value resulting from the bit shift of the element is stored in a second operand increment register. A second vector element is read out from the memory at the address corresponding to a value resulting from addition of the content of the second operand increment register to the second operand initial address register, the element being then stored at the memory location of the address given by a value resulting from the addition of the value of the first operand vector increment register to the first operand address.

1 Claim, 5 Drawing Sheets $C_i$ : BIT CORRES TO INITIAL COUNT $i$ n : CONTENT OF GENERAL-PURPOSE REGISTER (R+1)

DATA PROCESSING APPARATUS FOR PROCESSING LIST VECTOR INSTRUCTIONS

BACKGROUND OF THE INVENTION

The present invention relates to a general-purpose computer system having no vector register. More particularly, the invention concerns a computer system best suited for speeding up list processings or operations. ations.

A typical arrangement of the general-purpose computer to which the present invention is directed is schematically shown in FIG. 4 of the accompanying drawings. Referring to this figure, an instruction control unit 1 is destined for decoding instructions to be performed in the computer system, issuing operation commands to an arithmetic operation unit 2 and a memory control unit 3, controlling the sequence in which the instructions are executed, and so forth. The memory control unit 3 performs reading of data (also referred to as data fetch or fetching) from a main memory 4 and writing of data (also referred to as data store or storing) in the main memory 4. The latter is composed of a storing medium assigned with addresses. The data fetching as well as data storing operation to the main memory 4 is under command of the memory control unit 3. In the following description, the term "address" refers to the main memory 4 unless otherwise specified. A group of general-purpose registers generally denoted by a numeral 5 comprises a plurality of registers imparted with respective identification numbers. The number of the register to be used is designated by the instruction.

Now, it is assumed that a vector operation is to be performed with the general-purpose computer system shown in FIG. 4. In such case, an integrated array processor (referred to IAP in abbreviation) is usually added to the operation unit 2 for performing the vector processing or operation at a high speed. For particulars of the IAP, reference may be made, for example, to "Manual of HITAC M-180/200 H/280 H Integrated Array Processor" (Data Number 8080-2-041-20). In this conjunction, the instruction which requires the use of the IAP for its execution is referred to as an IAP instruction (or vector instruction).

A format of the IAP instruction is shown in FIG. 5. Operation of the instruction is designated by the "value of the general-purpose register indicated in the field B plus the value of the field D". The general-purpose register indicated in a field R1 stores therein an initial count indicative of the origin of a vector element to be processed. A general-purpose register indicated in a field (R1+1) stores therein a vector length which corresponds to the number of times the operation or processing is to be performed. The general-purpose register indicated in a field R3 designates the main memory address for the first byte of an operand address vector (referred to as OAV in abbreviation). The OAV is a table on the main memory which designates the address of a vector descriptor table (abbreviated to VDT) for the vector operand. More specifically, the OAV includes a leading address of VDT 2 (i.e. VDT of the second operand), a leading address of VDT 3 (i.e. VDT of the third operand), a leading address of VDT 1 (i.e. VDT of the first operand), and address of a control vector, as can be seen in FIG. 5.

The VDT has a format illustrated in FIG. 6. As will be seen, the VDT includes the address of the vector element at the leftmost or rightmost end (i.e. the address of the vector element to be first processed), a flag and an increment value (interval or space between vector elements).

The control vector consists of a bit string of "0s" or "1s+ and is formatted in a manner illustrated in FIG. 7. Individual bits of the control vector correspond to the operation units. More specifically, the leftmost bit as viewed in FIG. 7 corresponds to the initial count "0", the second leftmost bit corresponds to the count "1", the third leftmost bit to "2", and so forth. The length (n) of the control vector corresponds to the number indicated by the general-purpose register which in turn is designated by "the number in the field R1 plus 1".

The IAP instruction commands the operation on the second and third operands, the result of which is written in the first operand. The type of operation or processing is designated by "value of the general-purpose register indicated in the field B plus the value of the field D" mentioned hereinbefore, while the address of each operand vector is given by the aforementioned VDT. The position of the operand first to be processed is determined by an algebraic sum of the leading address of each operand and the product of the initial count indicated by the aforementioned field R1 and the increment value contained in the VDT. The content of the general-purpose register indicated by the field R1 is incremented by one every time an operation for a set of vector elements has been completed, wherein the next operation is performed on the operand located at the address corresponding to an algebraic sum of the leading address of each operand and the product of the number in the register or field R1 and the increment value contained in VDT. When the content of the register R1 becomes equal to that of the register (R1+1), execution of the instruction comes to an end. It should be mentioned that the control vector serves for enabling execution of the operation.

Now, let's consider a program which is expressed by FORTRAN sentences as follows:

DO 10 I = 1, 100

A(I) = B[C(I)]

10 CONTINUE

This program represents an operation on an array of arguments of other arrays, i.e. a so-called list operation or processing in which the element numbers of a vector constitute elements of another vector.

In this connection, it is noted that the hitherto known general-purpose computer system additionally provided with the IAP is not so arranged as to support the list operation. Accordingly, in order to execute the above list operation, the elements must be processed one by one (i.e. the vector elements must be processed one by one with the aid of a load instruction, store instruction and others), requiring a lot of time.

SUMMARY OF THE INVENTION

An object of the present invention is to provide a computer system capable of executing a list operation as a vector operation at an increased speed.

In scientific technological calculations, there often arise such cases in which an argument of an array constitutes an element of another array. As one of such cases, there may be mentioned the so-called list operation or processing in which the element number of a vector operand constitutes an element of another vector operand.

With the present invention, it is contemplated to allow a general-purpose computer system having no vector registers to perform operations on such vectors in which the element number of a vector operand is represented by an element of another vector operand (this operation is referred to as a list operation). To this end, there is provided according to an aspect of the invention a combination of a register for storing an increment value of a list vector, a register for storing an increment value of a second operand vector, a register for storing an initial address of the second operand vector, a register for storing an increment value of a first operand vector, means for adding the value of the list vector increment register to a fetch data address, means for adding the value of the second operand vector increment register to the fetch data address, means for adding the value of the first operand increment register to a store data address, and means for storing a value resulting from bit shift of data read out from a memory in the second operand increment register, wherein the list vector elements are read out from the memory at addresses determined by adding sequentially the values of the list vector increment register to the address of the list vector, the value resulting from the bit shift of the element being stored in the second operand increment register, and the second operand vector elements being read out from the memory equipment at addresses determined by values obtained by adding the contents of the second operand increment register to the initial address register for the second operand, the elements being stored in the memory locations designated by the addresses determined by adding sequentially values of the first operand vector increment register to the first operand address, to thereby enable execution of the list operation in terms of a vector operation with the aid of list operation instructions in which vector operands referred to as the list vector are made use of.

DESCRIPTION OF THE PREFERRED EMBODIMENTS

In the first place, description will be made of a list vector. The list vector serves for functions mentioned below. When J represents a certain integer, the address of the J-th element of the vector operand of an IAP instruction is ordinarily a value equal to the leading address of the operand which is added to an increment value multiplied by (J−1). The leading address of the operand and the increment value are indicated in the VDT. In contrast, the address of the J-th element of the vector operand designated by the list vector has a value equal to the leading address of the operand added to a multiple which corresponds to data destined to deal with the J-th element of the list vector.

As the instructions employing the list vector, a VMSX (an abbreviation of Vector Move Source Indexed) instruction and a VMTX (an abbreviation of Vector Move Target Indexed) instruction are established, specifications of these instructions being defined as follows;

VMSX instruction: The second operand is designated by the list vector, while no list vector is employed for the first operand. Individual vector elements of the second operand are stored at the corresponding positions of the first operand.

VMTX instruction: The first operand is designated by the list vector, while no list vector is employed for the second operand. Individual vector elements of the second operand are stored at the corresponding positions of the first operand.

In the following, functions of the list vector will be described by taking the VMSX instruction as an example.

Figure 3:
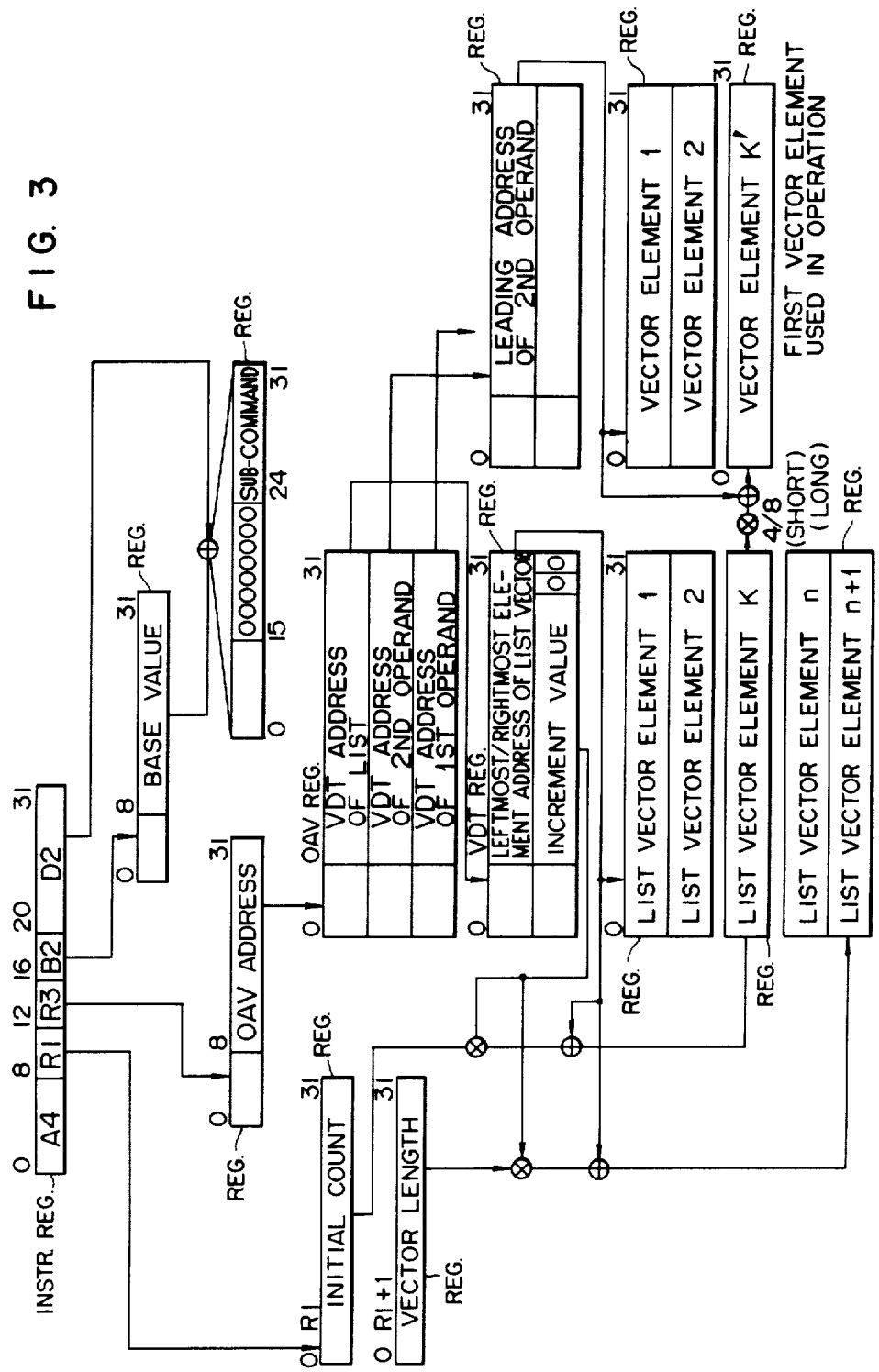
FIG. 3 is a view showing a format of VMSX instruction provided according to the teaching of the invention.

FIG. 3 illustrates operand designation of the VMSX instruction. The OAV includes the leading address of the VDT of the list vector, the leading address of the VDT of the second operand vector, and the leading address of the VDT of the first operand vector. The VDT of the list vector includes the leading address of the list vector and an increment value.

The address of the first vector element of the list vector is determined by adding the product of the initial count indicated in the field R1 and the increment value in the VDT of the list vector to the leading address of the list vector indicated in the VDT thereof. With the address thus derived, the first vector element of the list vector is obtained.

The address of the vector element of the second operand at the beginning of operation corresponds to a value determined by adding the first vector element of the aforementioned list vector multiplied with 4 (in case the operand is 32-bit data) or multiplied with 8 (in case the operand is 64-bit data) to the leading address of the second operand indicated in the VDT of the second operand. By using the address derived in this manner, the first vector element of the second operand is determined.

The manner in which the address of the vector element of the first operand is determined is similar to the case of the ordinary IAP instruction described hereinbefore.

The content of the general-purpose register indicated in the field R1 is incremented by "1" every time the operation for a set of vector elements (in the instant case, the processing for storing the second operand element at the first operand's address) has been completed. The second operand element employed in the subsequent operation is designated by using the list vector element located at an address determined through algebraic addition of the product of the updated number in the register R1 and the increment value in the VDT to the leading address of the list vector. The designation is realized by adding the aforementioned list vector element multiplied by 4 or 8 to the leading address of the second operand, as described hereinbefore.

At the time when the content of the register R1 becomes equal to that of the register (R1+1), execution of the instruction comes to an end.

The VMTX instruction is similar to the VMSX instruction except that the first operand is designated by the list vector and that the second operand makes use of no list vector.

Now, a first exemplary embodiment of the present invention will be described by referring to FIGS. 1 and 2.

Figure 1:
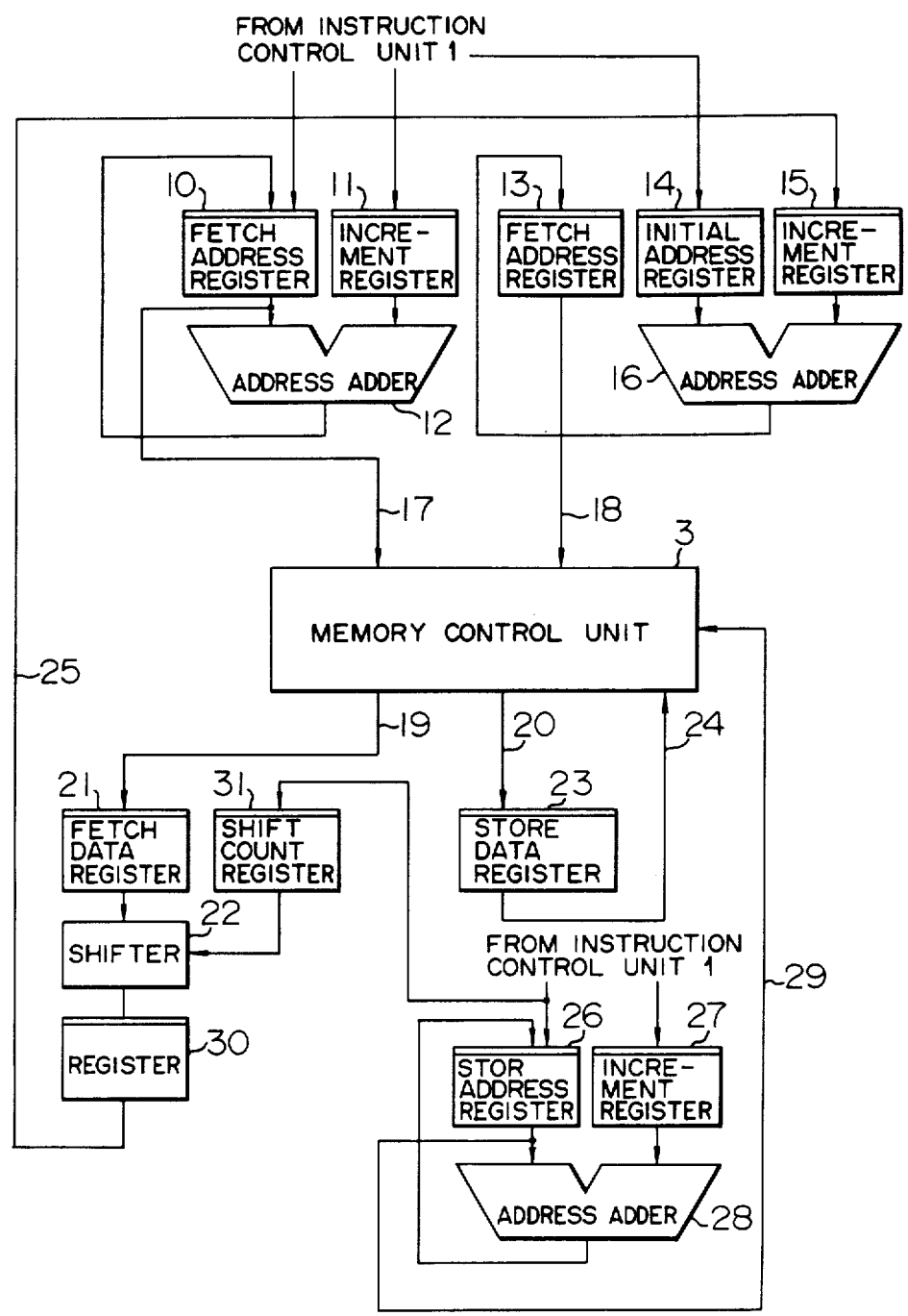
FIG. 1 is a block diagram showing schematically an arrangement of an operation system according to an embodiment of the invention.
Figure 2:
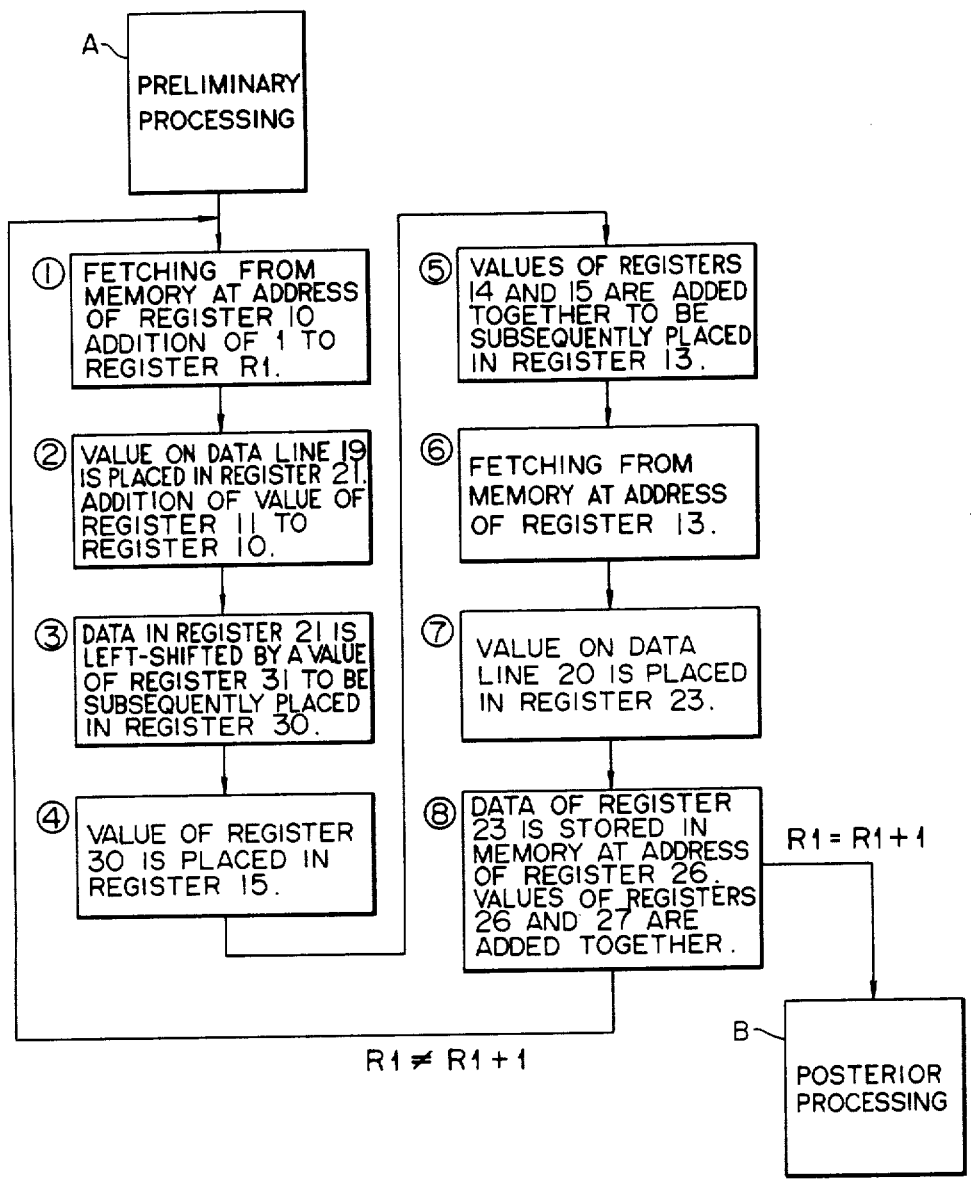
FIG. 2 is a flow chart for illustrating operation of the system shown in FIG. 1.
Figure 4:
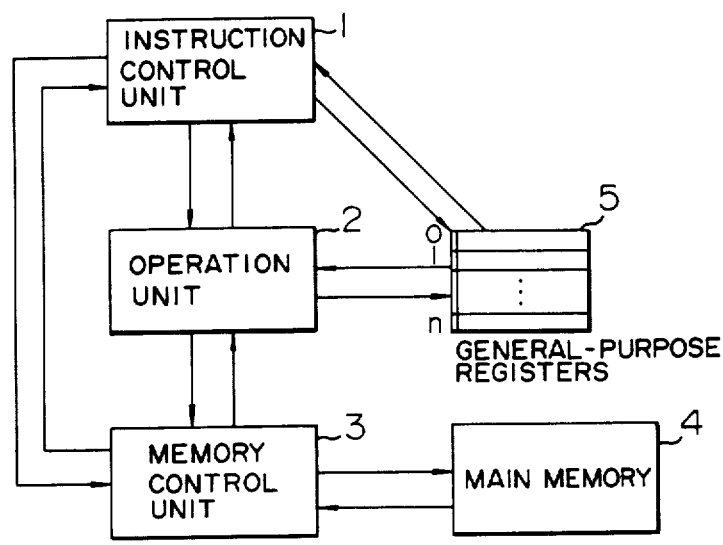
FIG. 4 is a view showing a general arrangement of a computer system to which the invention is directed.
Figure 6:
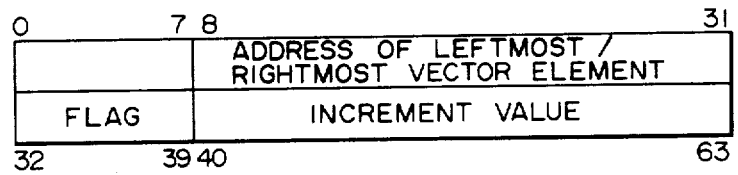
FIG. 6 is a view illustrating a format structure of a VDT shown in FIG. 5.
Figure 7:
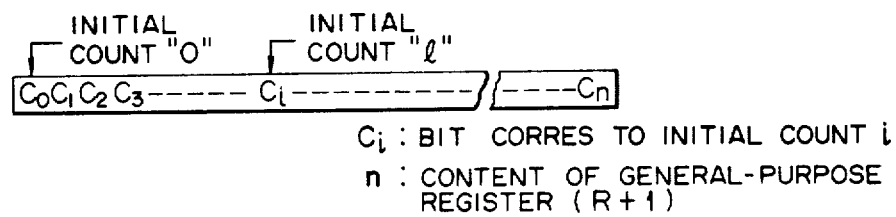
FIG. 7 is a view illustrating a format structure of a control vector shown in FIG. 5.
Figure 5:
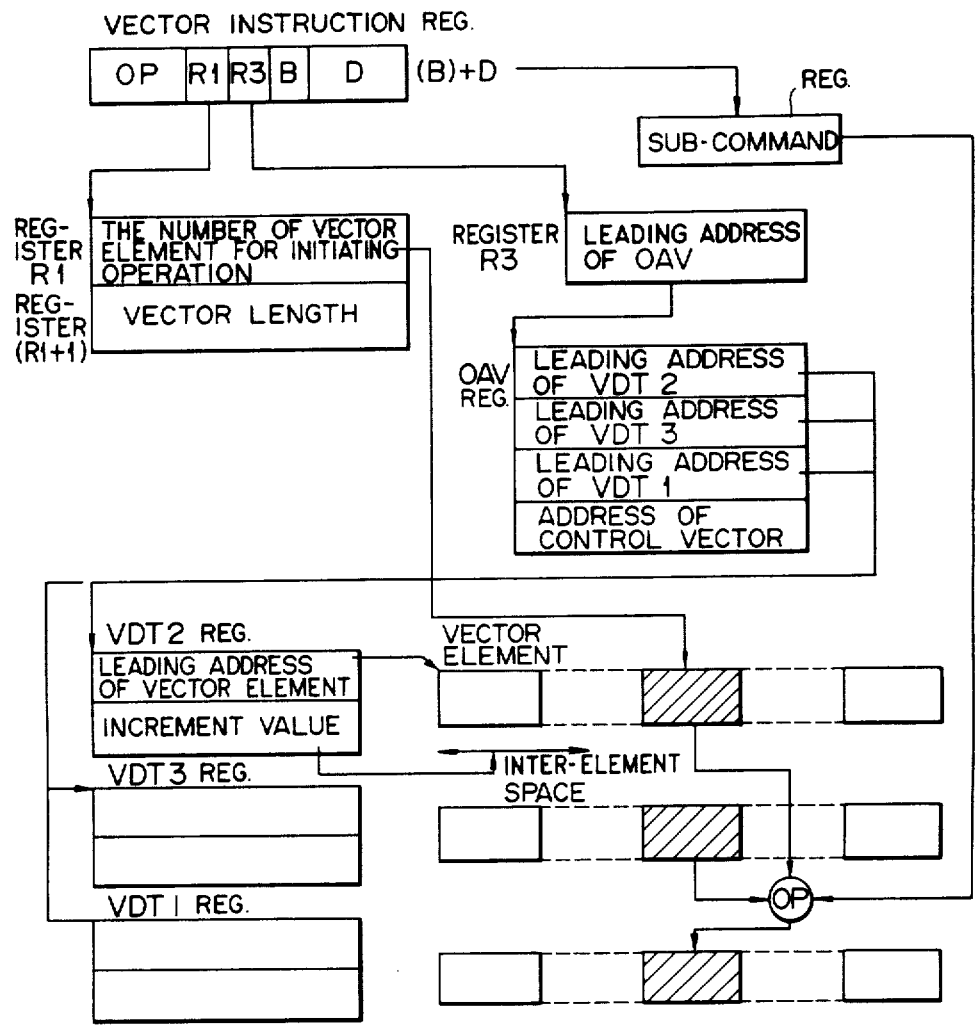
FIG. 5 is a view illustrating a format structure of an IAP instruction.

An arrangement shown in FIG. 1 corresponds to that of the operation unit 2 shown in FIG. 4. Referring to FIG. 1, reference numerals 10 and 13 denote fetch address registers where adrresses for the data to be fetched are set. The addresses set at the fetch address registers 10 and 13 are sent to the memory control unit 3 by way of fetch address lines 17 and 18, respectively, whereby data located at these addresses of the main memory 4 are read out (i.e. fetched). A fetch data register 21 stores therein the data read out from the main memory 4 through a fetch data line 19. A shifter 22 shifts the data placed in the register 21 to the left or to the right by the value set at a shift count register 31. The shifted data is stored in a register 30. A reference numeral 26 denotes a store address register at which the address for the data to be stored is set. The storing operation is effected in such a manner that the memory control unit 3 is supplied with data placed in a store data register 23 through a store data line 24 and stores the data at the main memory address set at the store address register 26 through a store address line 29.

A characteristic feature of the present invention resides in addition of increment registers 11, 15 and 27, an initial address register 14, address adders 12, 16 and 28 and a data line 25 to the structure described above.

The increment resister 11 stores therein the increment value of the list vector (indicated in the VDT of the list shown in FIG. 3). The initial address register 14 stores therein the leading address of the second operand (indicated in the VDT of the second operand shown in FIG. 3). The increment register 15 stores therein the value of the register 30. On the other hand, the increment register 27 stores therein the increment value of the first operand vector (indicated in the VDT of the first operand). The address adder 12 adds the values of the fetch address register 10 and the increment address register 11 to each other, the resultant sum being stored again in the fetch address register 10. The address adder 16 adds together the values of the initial address register 14 and the increment address register 15, the resultant sum being stored in the fetch address register 13. The address adder 28 adds together the values of the store address register 26 and the increment register 27, the sum being stored again in the store address register 26. Hereinafter, operation of the VMSX instruction will be described, by way of example.

The operation unit 2 according to the invention is controlled in accordance with a microprogram. A microprogram for the VMSX instruction is illustrated in FIG. 2. In precedence to the execution of the microprogram, the instruction control unit 1 performs the register settings or loadings as follows. Namely, the leading address of the list vector (indicated in VDT of the list vector shown in FIG. 3) is loaded in the fetch address register 10. The increment value of the list vector is loaded in the increment register 11. The leading address of the second operand is loaded in the initial address register 14. The leading address of the first operand (included in VDT of the first operand) is loaded in the store address register 26. The increment value of the first operand vector is loaded in the increment register 27. Finally, the shift count register 31 is loaded with "4" in case the operand data is 32-bit data or "8" in case the operand data is 64-bit- data. These loadings are preliminary processings A.

Now, description will be made by referring to FIG. 2.

At a step ①  of the microprogram, data is read out (fetched) from the main memory 4 at the address designated by the value set in the fetch register 10. This data as read out is the first element of the list vector. At this time point, the register R1 (containing the initial count) is added with "1" (i.e. incremented), because one element has been processed.

At a step ②, data of the first element of the list vector read out at the step ① appearing on the fetch data line 19 is placed in the fetch data register 21. Further, the address of the next element of the list vector is determined by adding the value of the increment register 11 to the value of the fetch address register 10.

At a step ③, the first element of the list vector stored in the fetch data register 21 is shifted to the left by the number indicated by the shift count register 31 to be subsequently placed in the register 30.

At a step ④, the value of the register 30, i.e. the shifted initial value of the list vector, is placed in the increment register 15.

At a step ⑤, the result of shifting of the first element of the list vector as stored in the increment register 15 is added to the leading address of the second operand stored in the initial address register 14, the sum thus obtained being placed in the fetch address register 13. The value now set in this register 13 represents the address of the first element of the second operand.

At a step ⑥, data is read out from the main memory at the address designated by the content of the fetch address register 13.

At a step ⑦, the first element of the second operand as read out is placed in the store data register 23.

At a step ⑧, the first element of the second operand stored in the store data register 23 is set at the leading address of the first operand indicated by the store address register 26, whereupon the element of VMSX instruction has been processed. The address of the next element of the first operand is determined by adding the leading address of the first operand stored in the store address register 26 to the increment value of the first operand stored in the increment register 27, the sum being stored again in the store address register 26.

If the value of the register R1 (i.e. the number of the last processed element) equals the value of the (R1+1) register 23 (the number of the last element), it is decided that the operation has been completed, and posterior processings B are executed. Otherwise, the step ① is regained to start the processing of the next element. In the posterior processing, acception of interrupt occurring in succession to the execution of the last step as well as loading of "0" in the register R1 is performed.

Through the procedure described above, the VMSX instruction is executed. The VMTX instruction can be executed through essentially similar procedure.

As will be appreciated from the foregoing description, the present invention makes it possible to execute the list operation in terms of vector operation in the general-purpose computer system, whereby the processing of a program including list operation in which the argument of an array constitutes an element of another array can be performed at an increased speed.

We claim:

1. A general-purpose computer system having a memory, but no vector registers, comprising:
instruction control means responsive to a list vector instruction for providing an increment value of a list vector, an initial address of a second operand vector, an increment value of a first operand vector, an initial address of said list vector and an initial address of a first operand vector; a first register for storing said increment value of a list vector; a second register for storing an increment value of a second operand vector; a third register for storing said initial address of the second operand vector; a fourth register for storing said increment value of a first operand vector; a fifth register for storing a fetch data address, the initial value of which is said initial address of said list vector; a sixth register for storing a store data address, the initial value of which is said initial address of the first operand vector; first adding means for adding the value stored in said first register to the fetch data address stored in said fifth register and for storing as a fetch data address the result of addition representative of an address of the list vector into said fifth register; second adding means for adding the value stored in said second register to a value stored in said third register; third adding means for adding the value stored in said fourth register to the store data address stored in said sixth register and for storing as a store data address the result of addition representative of an address of the first operand vector into said sixth register; bit shift means for performing bit shifting of an element of the list vector read out from said memory in response to the fetch data address stored in said fifth register and for storing a value resulting from the bit shift into said second register; and memory control means for (i) reading out elements of the list vector from said memory at addresses determined by said first adding means adding sequentially values stored in said first register to the fetch data address stored in said fifth register for storing said read-out elements into said second register after bit shift thereof by said bit shift means, and (ii) reading out elements of the second operand vector from the memory at addresses determined by a value obtained by adding sequentially values stored in said second register to the initial address of the second operand vector stored in said third register by said second adding means and for storing said second operand vector elements into memory locations designated by addresses determined by adding sequentially values stored in said fourth register to an address of the first operand vector stored in said sixth register by said third adding means; whereby a list operation specified by a list vector instruction can be executed in which the number of an element of the second operand vector is represented by an element of the list vector.

* * * * *